April 28, 1959　　　　B. WELLS　　　　2,883,731
BUDDY CART

Filed Feb. 6, 1958　　　　　　　　　　2 Sheets-Sheet 1

INVENTOR:
Bessina Wells,
BY
Joseph B. Lindecker
ATT'Y.

April 28, 1959      B. WELLS      2,883,731
BUDDY CART
Filed Feb. 6, 1958      2 Sheets-Sheet 2
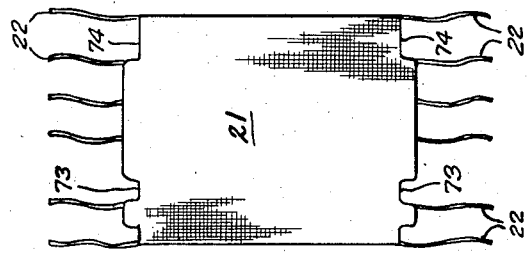
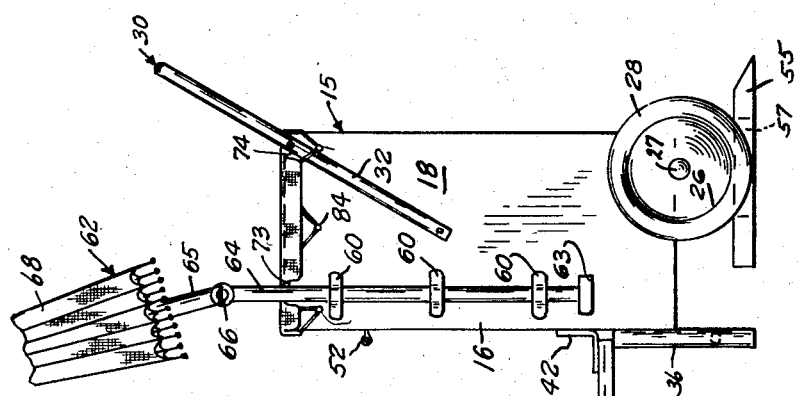
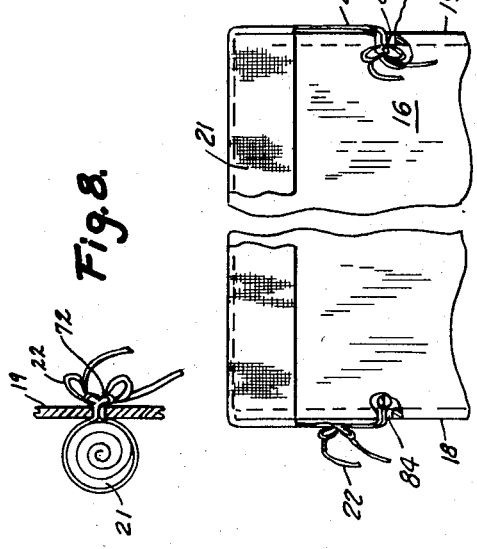
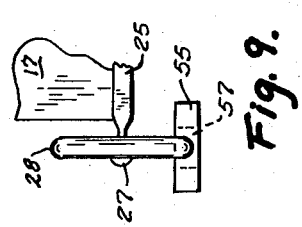
INVENTOR:
Bessina Wells,
BY Joseph B. Lindecker
ATT'Y United States Patent Office 2,883,731
Patented Apr. 28, 1959

2,883,731
BUDDY CART
Bessina Wells, Chicago, Ill.
Application February 6, 1958, Serial No. 713,754
2 Claims. (Cl. 280—47.26)

The present invention relates to new and useful improvements in buddy carts and more particularly to a hand cart having a body portion or receptacle formed as a part thereof.

The present invention further relates to a buddy cart including a receptacle type body with an upstanding handle attached at the rear of the cart and having means for attaching an axle to the rear of the bottom panel of the receptacle, the axle having a pair of wheels mounted upon the ends thereof, a stand embodying a pair of legs secured to the forward and lower portions of the receptacle to keep the cart in proper position with sides vertical and bottom panel horizontal when resting upon the wheels and stand, and a seat for the user hingedly secured to front of the cart, the seat when not in use may be conveniently folded upwardly against the front panel of the cart.

The present invention further relates to a buddy cart having a structure provided with means attached to the side panel of the body portion of the cart to support the staff portion of an umbrella whereby the staff of the umbrella may be inserted when it is desired to use the umbrella, or the staff may be removed when the umbrella is to be stored within the receptacle when not in use, the staff being made of a plurality of sections and suitably joined together.

The invention further relates to a buddy cart having a structure provided with means upon the rear panel of the cart for supporting a removable canteen, said means embodying a base plate and suitable strap members to removably hold the canteen to the cart.

An important object of the invention is to provide a cart of the above-indicated character of simple and practical construction, which is neat in appearance, strong and durable, relatively inexpensive to manufacture and otherwise well adapted for the purposes for which the same is intended.

With these and other objects in view, the invention consists in certain novel features of construction and combination of parts, as will be hereinafter fully described and, in which, the separate parts are designated by suitable reference characters in each of the views, and in which:

Fig. 5 is a side elevational view of the cart shown by Fig. 2, a complete umbrella assembled therewith, the collapsible seat in lowered position and road-blocks in place about the wheels;

Fig. 6 is a plan view of the flexible cover for use with the cart shown by Figs. 1–5;

Fig. 7 is a fragmentary elevational view of the receptacle with a flexible cover tied to suitable eyelet means assembled with the receptacle;

Fig. 8 is a fragmentary sectional view, taken substantially on line 8—8 of Fig. 4, showing the cover in rolled position and secured at the side panel by suitable ties; and Fig. 9 is a partial view of the cart shown by Fig. 1 with a road-block placed beneath one of the wheels thereof.

Figure 1:
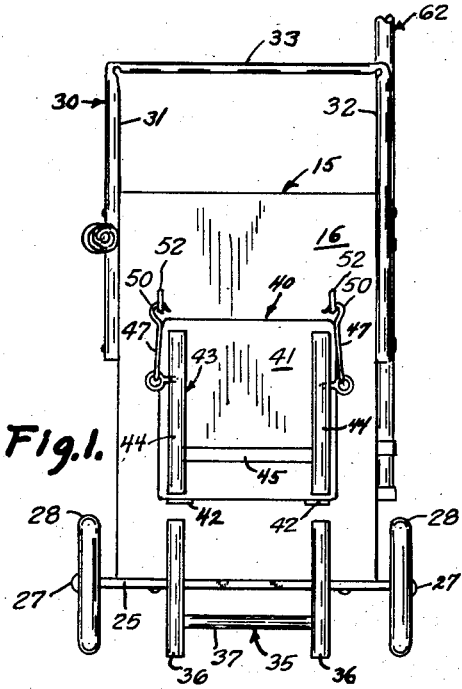
Figure 1 is a front elevational view of the buddy cart made according to my invention, with a fragmentary portion of an umbrella staff removably mounted therewith.

Referring to the drawings, my improved buddy cart comprises a main receptacle body 15, which has rigid rectangular shaped front, rear and side panels 16, 17, 18 and 19. The receptacle is closed at its base by a rigid bottom panel 20, and at the top by a removable canvas cover 21 embodying a plurality of string ties 22 arranged about the periphery thereof. An axle 25 is secured to the bottom panel 20 by bolts 26, or other suitable means. The axle 25 is generally made of tubular stock sufficient to support heavy loads, having steel disk wheels 26 journaled upon the ends thereof, cotter-pins used to secure the wheel 26 thereon, the axle ends covered by metal hub caps 27, and the wheels having hard rubber balloon type tires 28 mounted thereon. A tubular steel handle 30, of inverted U-shape configuration is assembled with the body receptacle 15, the handle comprises common side arms, or members 31, 32, and a top crosshead 33; the steel handle crosshead being straight with straight depending side arms to coincide with the shape of the cart. The handle is assembled with the side panels 18 and 19 so as to extend upwardly and rearwardly thereof to give a better balance when the cart is tilted over upon wheels 26 so it can be pushed or pulled. The correct angle of assembly of the handle 30 causes the heaviest portion of the load in the cart to rest against the back panel 17 of the cart, thereby making it suitable for easier handling.

The so formed and constructed two-wheeled cart, when tipped, can be easily pulled along on its wheels. When upright, a metal stand 35 secured to the lower, forward base portion of the cart provides a sturdy non-slipping base. The stand 35 consists of a pair of vertical legs 36 with a cross bar 37 welded together. The upper portion of the legs rest against and are additionally secured to the front panel 16.

To the outside of the front panel 16 is secured a seat 40 consisting of a seat panel 41, hinged to the panel 16, by hinges 42, and to the under side of which seat panel and near its outer edge is hinged the upper end of the support 43, consisting of vertical legs 44 and cross member 45. The support 43 is hinged to said seat panel by a pair of hinges 46. When the support 43 is resting upon the ground it is fastened, or locked, at right angles to the seat panel 41 by a pair of hooks 47 secured to legs 44 by eyelets 48 positioned intermediate the end portions of said legs 44, the curved end portions 50 of the hooks 47 being inserted in eyelets 49 secured in the forward portion of the side edges of said seat panel 41, as shown by Fig. 5.

Figure 2:
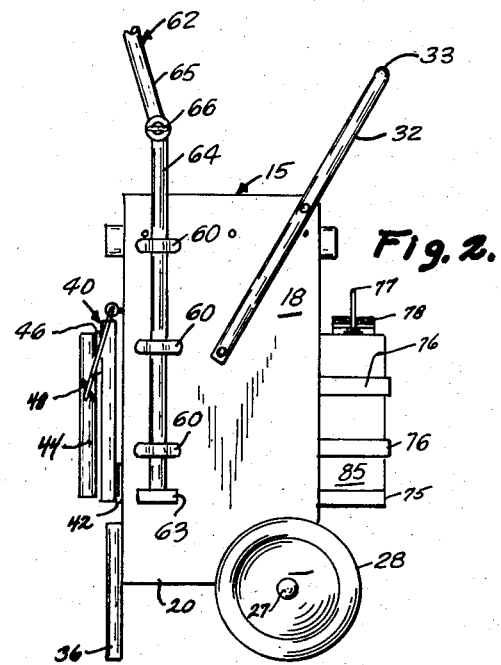
Fig. 2 is a side elevational view of the cart shown by Fig. 1, showing the means for supporting the umbrella staff when mounted with the left side panel thereof.
Figure 4:
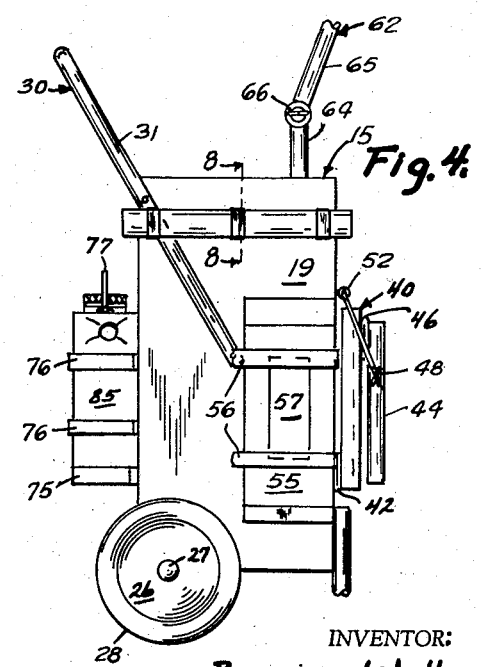
Fig. 4 is a side elevational view of the cart shown by Figure 2, showing the means for supporting a rolled flexible cover member when mounted with the right side panel thereof.

When not in use, the seat 40 is folded up against the front panel 16, as illustrated by Figures 1, 2 and 4, in order that the seat may occupy but little room when not in use and be conveniently carried by the cart. The seat 40 is locked in said folded position by inserting the curved ends 50 of the hooks 47 into eyelets 52 secured in the upper portion of the front panel 16, as shown by Figs. 1 and 2. When the seat 40 is in use, the weight of the user upon panel 41 is distributed at the rear upon the upper ends of legs 36 of stand 35, and at the front upon the upper ends of legs 44, clearly shown by Fig. 5.

In order to keep the buddy cart from moving when the user is seated upon the seat 40, two safety wheel blocks or stops 55 are pushed under the wheels 26; the stand 35 will also tend to prevent movement thereof. The safety stops 55 are made of wood, or hard rubber, one end of each stop being tapered downwardly to a fraction of an inch to form a wedge to assist when they are pushed beneath the wheels. The central portions 57 thereof are hollowed out to prevent the tires 28 of the wheels 26 from rolling off the blocks. Said safety blocks 55 may be supported upon the side panel 19 by resilient straps 56, as shown by Fig. 4.

As a convenient accessory for the users of the buddy cart, spring clips, or straps 60, may be affixed to the side panel 18 for the retention of an umbrella 62; a stop block 63 is arranged directly beneath said stops 60 to support the weight of the umbrella. The umbrella 62 is made on the same common style of any beach umbrella, with a wooden staff consisting of a lower portion 64 and an upper portion 65 joined together with a ball bearing type joint 66 that will move in any sidewise direction. This is necessary because when the umbrella is used, the user desires to bend the upper portion 65 backward, or forward, to keep out sun, wind or rain. When the umbrella is closed, it is to be set inside the cart for carriage. When it is to be used, the lower portion 64 is inserted into the straps 60, resting on stop block 63. The umbrella top portion 68 is made of light canvas, tarpaulin, or some heavy suitable material that is water repellent, the rib portion being collapsible and expandable.

The waterproof canvas cover 21 is of sufficient size to cover the top of the receptacle body 15 and extend downwardly on the side panels 18 and 19. Three holes 84 are drilled in each of said side panels 18 and 19. When the cover 21 is applied over the cart 15 the strings, or ties 22, are inserted through the holes 84 in side panels and tied in knots 70, as shown by Fig. 7. When the cover 21 is removed from the top of the cart, it is rolled and supported upon the side of one of the panels, the ties 22 extending inside the receptacle and formed into knots 72, as shown by Fig. 8. The cover 21 is suitably notched along the side portions thereof as at 73 and 74, to receive the upwardly extending parts such as the staff 64 of the umbrella and arms 31 and 32 of the handle 30.

Figure 3:
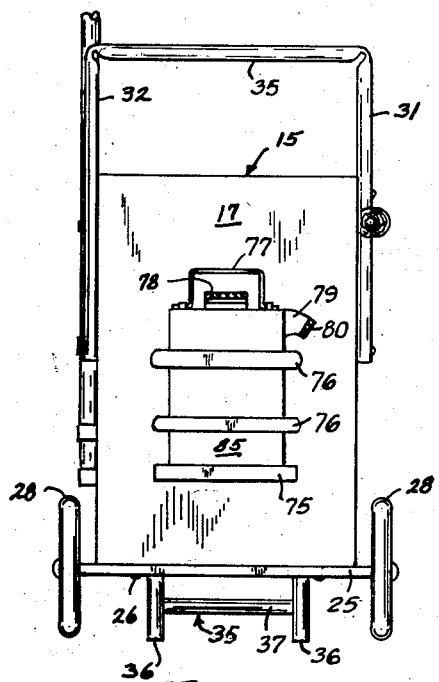
Fig. 3 is a rear elevational view of the cart shown by Figures 1 and 2, specifically showing the means for supporting a canteen when mounted therewith.

The rear panel 17 is suitably provided with a supporting panel 75 and horizontal straps 76 to retain and support a canteen 85. The straps are generally two inches in width and long enough to reach around a rectangular type canteen and hold it secure, as shown by Fig. 3. The canteen, or vacuum container, is generally fourteen inches high, ten inches wide and five inches in thickness. A handle 77 is generally arranged upon the top portion thereof. The canteen has the usual screw cap 78 and spout 79 with screw cap 80.

From the above description taken in connection with my drawings, it will be apparent that I have provided a wheeled appliance that may be manipulated with facility when conveying or carrying a load, and one that will give pleasure and protection to the user. Being of simple construction, the cart may be economically manufactured, and can be adjusted to various positions for use without the use of tools.

Having thus described my invention, I claim:

1. A wheeled cart of the class described, comprising a main hollow body receptacle defined by solid side panels, solid front and rear panels, and a solid bottom panel, a foldable seat with its rear end hingedly secured to the front panel above said bottom panel, an axle transversely secured to the rear end of said bottom panel with wheels journaled at the ends thereof, a pair of vertical, straight legs mounted upon the front panel adjacent the bottom panel and below said seat, the horizontal distance between said vertical legs being less than the width of said front panel, said foldable seat having a pair of foldable legs hingedly secured to the forward under surface thereof, and the rear of said seat resting upon the top of said pair of vertical legs mounted upon the front body panel whereby said legs form an added support to the rear of said seat when it is in its lowered and useable position.

2. A cart as described in claim 1 wherein a hook is pivotably secured to said foldable legs to secure said seat to said front panel when in folded-up position, and to secure said seat at right angles to said foldable legs when in its folded position.

References Cited in the file of this patent

UNITED STATES PATENTS

| 464,533 | Taylor | Dec. 8, 1891 |
| 958,307 | Plourde | May 17, 1910 |
| 1,597,640 | Vordemfelde | Aug. 24, 1926 |
| 1,605,550 | Krugly | Nov. 2, 1926 |
| 1,970,727 | Bates | Aug. 21, 1934 |
| 2,572,486 | Isaac | Oct. 23, 1951 |
| 2,579,639 | Adams | Dec. 25, 1951 |
| 2,627,217 | Hainke | Feb. 3, 1953 |
| 2,806,711 | Jacobs | Sept. 17, 1957 |

FOREIGN PATENTS

| 835,408 | Germany | Mar. 31, 1952 |
| 18,749 | Great Britain | of 1903 |